(12) United States Patent
Miura et al.

(10) Patent No.: US 10,562,376 B2
(45) Date of Patent: Feb. 18, 2020

(54) REFRIGERATION CYCLE DEVICE

(71) Applicant: DENSO CORPORATION, Kariya, Aichi-pref. (JP)

(72) Inventors: Koji Miura, Kariya (JP); Yoshiki Kato, Kariya (JP); Kengo Sugimura, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 65 days.

(21) Appl. No.: 16/060,083

(22) PCT Filed: Oct. 6, 2016

(86) PCT No.: PCT/JP2016/079724
§ 371 (c)(1),
(2) Date: Jun. 7, 2018

(87) PCT Pub. No.: WO2017/098796
PCT Pub. Date: Jun. 15, 2017

(65) Prior Publication Data
US 2018/0354344 A1    Dec. 13, 2018

(30) Foreign Application Priority Data
Dec. 11, 2015  (JP) ................................ 2015-242302

(51) Int. Cl.
*B60H 1/32*      (2006.01)
*F25D 21/00*    (2006.01)

(52) U.S. Cl.
CPC ........... *B60H 1/321* (2013.01); *F25D 21/002* (2013.01); *B60H 2001/3257* (2013.01)

(58) Field of Classification Search
CPC ................ B60H 1/00899; B60H 1/321; B60H 2001/00961; B60H 2001/3257; B60H 2001/3258; B60H 2001/327; F25D 21/002
See application file for complete search history.

(56) References Cited

U.S. PATENT DOCUMENTS

2015/0129161 A1*  5/2015 Nishikawa ............. B60K 11/02
                                                              165/43
2016/0101666 A1    4/2016 Sugimura et al.
(Continued)

FOREIGN PATENT DOCUMENTS

JP         2014163564 A     9/2014
WO    WO-2011015426 A1     2/2011
(Continued)

*Primary Examiner* — Marc E Norman
(74) *Attorney, Agent, or Firm* — Harness, Dickey & Pierce, P.L.C.

(57) ABSTRACT

A refrigeration cycle device includes: a high-pressure side heat exchanger; a low-pressure side heat exchanger; a vehicle-mounted device that supplies heat to the heat medium; a heat-medium air heat exchanger that exchanges heat between the heat medium and air; a switching portion that switches between a state in which the heat medium circulates through the high-pressure side heat exchanger and a state in which the heat medium circulates through the low-pressure side heat exchanger with respect to each of the vehicle-mounted device and the heat-medium air heat exchanger; and a controller that drives the compressor, while controlling an operation of the switching portion to switch to a defrosting mode in which the heat medium circulates between the low-pressure side heat exchanger and the vehicle-mounted device, and the heat medium circulates between the high-pressure side heat exchanger and the heat-medium air heat exchanger, when defrosting of the heat-medium air heat exchanger is necessary.

13 Claims, 9 Drawing Sheets

(56) References Cited

U.S. PATENT DOCUMENTS

2016/0159204 A1* 6/2016 Katoh .................. B60H 1/3211
                                                      62/185
2016/0332505 A1* 11/2016 Yamanaka ............. B60H 1/143
2016/0339767 A1* 11/2016 Enomoto .............. F25B 25/005

FOREIGN PATENT DOCUMENTS

| WO | WO-2014196138 A1 | 12/2014 |
| WO | WO-2015107582 A1 | 7/2015 |
| WO | WO-2015122137 A1 | 8/2015 |

* cited by examiner

REFRIGERATION CYCLE DEVICE

CROSS REFERENCE TO RELATED APPLICATIONS

This application is a U.S. National Phase Application under 35 U.S.C. 371 of International Application No. PCT/JP2016/079724 filed on Oct. 6, 2016 and published in Japanese as WO 2017/098796 A1 on Jun. 15, 2017. This application is based on and claims the benefit of priority from Japanese Patent Application No. 2015-242302 filed on Dec. 11, 2015. The entire disclosures of all of the above applications are incorporated herein by reference.

FIELD OF THE INVENTION

The present disclosure relates to a refrigeration cycle device.

BACKGROUND ART

Conventionally, for example, Patent Document 1 describes a refrigeration device having a hot gas heater cycle. The hot gas heater cycle is a cycle that heats an evaporator by using hot gas. The hot gas refers to a refrigerant compressed by a compressor.

In the related art, the hot gas heater cycle is used in a defrosting cycle. The defrosting cycle is a cycle that melts frost formed at the evaporator by heating.

RELATED ART DOCUMENT

Patent Document

[Patent Document 1] Japanese Unexamined Patent Application Publication No. 2014-163564

SUMMARY OF INVENTION

The above-mentioned defrosting cycle in the related art cannot attain more defrosting capacity than the power of the compressor. Hence, the power consumed by the compressor increases due to defrosting, thus making it difficult to accomplish the defrosting in a situation where the usable power is limited, for example, during parking.

The present disclosure has been made in view of the foregoing matter, and it is an object of the present disclosure to provide a refrigeration cycle device which can perform defrosting while reducing power consumption.

A refrigeration cycle device according to an aspect of the present disclosure includes: a compressor that draws and discharges a refrigerant; a high-pressure side heat exchanger that exchanges heat between the refrigerant having a high pressure and discharged from the compressor and a heat medium; a decompression portion that decompresses the refrigerant heat-exchanged in the high-pressure side heat exchanger; a low-pressure side heat exchanger that exchanges heat between the refrigerant having a low pressure and decompressed in the decompression portion and the heat medium; a first pump that draws and discharges the heat medium circulating through the low-pressure side heat exchanger; a second pump that draws and discharges the heat medium circulating through the high-pressure side heat exchanger; a vehicle-mounted device through which the heat medium circulates and that supplies heat to the heat medium; a heat-medium air heat exchanger that exchanges heat between the heat medium and air; a switching portion that switches between a state in which the heat medium circulates through the high-pressure side heat exchanger and a state in which the heat medium circulates through the low-pressure side heat exchanger with respect to each of the vehicle-mounted device and the heat-medium air heat exchanger; and a controller. The controller is configured to drive the compressor, while controlling an operation of the switching portion to switch to a defrosting mode in which the heat medium circulates between the low-pressure side heat exchanger and the vehicle-mounted device, and the heat medium circulates between the high-pressure side heat exchanger and the heat-medium air heat exchanger, when the controller determines that a defrosting of the heat-medium air heat exchanger is necessary.

Thus, heat of the vehicle-mounted device is pumped up from the side of the low-pressure side heat exchanger to the side of the high-pressure side heat exchanger via the heat medium, and then the heat can be dissipated into the heat-medium air heat exchanger via the heat medium. In this way, the heat-medium air heat exchanger can be defrosted using the heat of the vehicle-mounted devices. Therefore, defrosting can be performed on the heat-medium air heat exchanger, while reducing the power consumption in the compressor.

DESCRIPTION OF EMBODIMENTS

Figure 1:
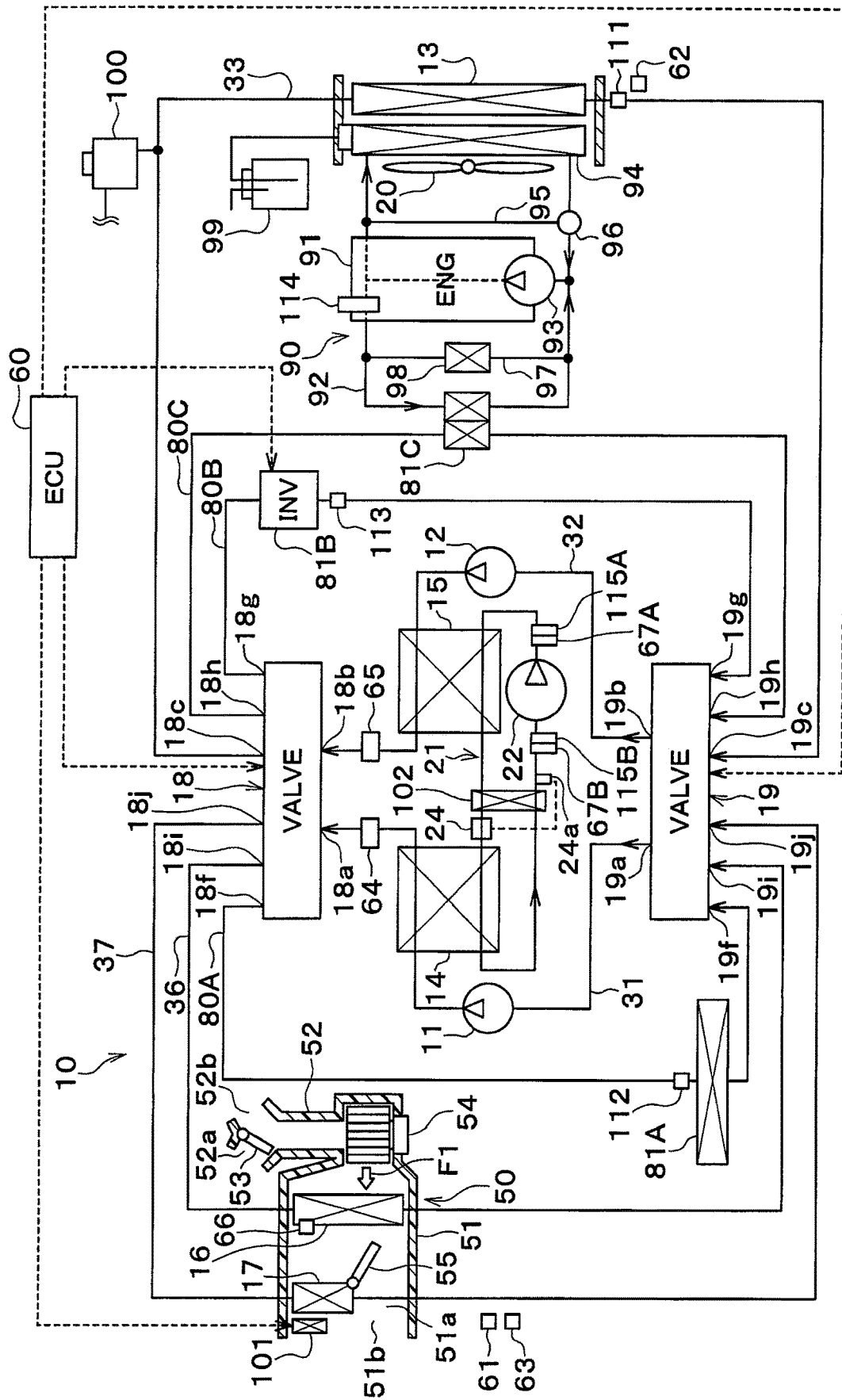
FIG. 1 is an entire configuration diagram of a vehicle thermal management system in one embodiment.

Embodiments of a refrigeration cycle device will be described below with reference to the accompanying drawings. A vehicle thermal management system 10 shown in FIG. 1 is used to adjust various devices mounted on a vehicle or the vehicle interior to an appropriate temperature. In the present embodiment, the thermal management system 10 is applied to a hybrid vehicle that can obtain driving force for traveling from both an engine (for example, an internal combustion engine) and an electric motor for traveling.

The hybrid vehicle in the present embodiment is configured as a plug-in hybrid vehicle that can charge a battery (for example, vehicle-mounted battery) mounted on the vehicle, with power supplied from an external power source (for example, a commercial power source) during stopping of the vehicle. For example, a lithium ion battery can be used as the battery.

The driving force output from the engine is used not only to cause the vehicle to travel, but also to operate a power generator. The power generated by the power generator and the power supplied from an external power source can be stored in the battery. The power stored in the battery is supplied to various vehicle-mounted devices, such as electric components configuring the thermal management system 10, as well as the traveling electric motor.

As shown in FIG. 1, the thermal management system 10 includes a first pump 11, a second pump 12, a radiator 13, a coolant cooler 14, a coolant heater 15, a cooler core 16, a heater core 17, a first switching valve 18, and a second switching valve 19.

Each of the first pump 11 and the second pump 12 is an electric pump that draws and discharges a coolant. The coolant is a fluid serving as the heat medium. In the present embodiment, the coolant suitable for use is a liquid containing at least ethylene glycol, dimethylpolysiloxane, or a nanofluid, or an antifreeze fluid.

The radiator 13 is a coolant outside-air heat exchanger that exchanges heat between the coolant and the air outside a vehicle cabin (hereinafter referred to as the outside air). The radiator 13 exchanges sensible heat between the coolant and the outside air. The coolant at a temperature equal to or higher than the outside air temperature is allowed to flow through the radiator 13, thereby enabling heat dissipation from the coolant into the outside air. The coolant at a temperature equal to or lower than the outside air temperature is allowed to flow through the radiator 13, thereby enabling heat absorption from the outside air into the coolant. For example, the radiator 13 can exhibit the function of a heat radiator that dissipates heat from the coolant into the outside air, and the function of a heat sink that absorbs heat from the outside air into the coolant.

The radiator 13 is a heat transfer device that has a flow passage through which the coolant circulates and transfers heat to and from the coolant having its temperature adjusted by the coolant cooler 14 or coolant heater 15.

An exterior blower 20 is an electric blower that blows the outside air to the radiator 13. The radiator 13 and the exterior blower 20 are disposed at the forefront of the vehicle. Thus, the traveling air can hit the radiator 13 during traveling of the vehicle.

Each of the coolant cooler 14 and the coolant heater 15 is a coolant-temperature adjustment heat exchanger that adjusts the temperature of the coolant by exchanging heat with the coolant. The coolant cooler 14 is a coolant-cooling heat exchanger that cools the coolant. The coolant heater 15 is a coolant-heating heat exchanger that heats the coolant.

The coolant cooler 14 is a low-pressure side heat exchanger that absorbs heat into a low-pressure side refrigerant from the coolant by exchanging heat between the coolant and the low-pressure side refrigerant in a refrigeration cycle 21. The coolant heater 15 is a high-pressure side heat exchanger that dissipates heat from a high-pressure side refrigerant into the coolant by exchanging heat between the coolant and the high-pressure side refrigerant in the refrigeration cycle 21.

The refrigeration cycle 21 is a vapor-compression refrigerator that includes a compressor 22, the coolant heater 15, a receiver (not shown), an expansion valve 24, and the coolant cooler 14. The refrigeration cycle 21 in the present embodiment configures a subcritical refrigeration cycle in which a high-pressure side refrigerant pressure does not exceed the critical pressure of the refrigerant, using a fluorocarbon refrigerant as the refrigerant.

The compressor 22 is an electric compressor driven by power supplied from the battery. The compressor 22 draws and compresses the refrigerant in the refrigeration cycle 21 to discharge the compressed refrigerant therefrom. The coolant heater 15 is a condenser that condenses a high-pressure side refrigerant by exchanging heat between the coolant and the high-pressure side refrigerant discharged from the compressor 22. That is, in the coolant heater 15, the high-pressure side refrigerant changes latent heat.

The receiver (not shown) is a gas-liquid separator that separates a gas-liquid two-phase refrigerant flowing out of the coolant heater 15 into a gas-phase refrigerant and a liquid-phase refrigerant, and then causes the separated liquid-phase refrigerant to flow to a side of the expansion valve 24. The expansion valve 24 is a decompression device that decompresses and expands the liquid-phase refrigerant flowing out of the receiver 23.

The expansion valve 24 has a thermo-sensitive portion 24a. The thermo-sensitive portion 24a detects the superheat degree of the refrigerant on an outlet side of the coolant cooler 14 based on the temperature and pressure of the refrigerant on the outlet side of the coolant cooler 14. The expansion valve 24 is a thermal expansion valve. The thermal expansion valve adjusts a throttle passage area by a mechanical mechanism such that the superheat degree of the refrigerant on the outlet side of the coolant cooler 14 is within a predetermined range previously set.

The thermo-sensitive portion 24a may be configured of a thermistor, and the expansion valve may use an electric expansion valve that adjusts a throttle passage area by an electric mechanism such that the superheat degree of the refrigerant on the outlet side of the coolant cooler 14 is within a predetermined range previously set.

The coolant cooler 14 is an evaporator that evaporates a low-pressure refrigerant by exchanging heat between the coolant and the low-pressure refrigerant decompressed and expanded by the expansion valve 24. That is, in the coolant cooler 14, the low-pressure refrigerant undergoes a change of state with latent heat. The gas-phase refrigerant evaporated at the coolant cooler 14 is drawn into and compressed by the compressor 22.

The radiator 13 cools the coolant by using the outside air, while the coolant cooler 14 cools the coolant by using the low-pressure refrigerant in the refrigeration cycle 21. Thus, the temperature of the coolant cooled by the coolant cooler 14 can be made lower than the temperature of the coolant cooled by the radiator 13. Specifically, the radiator 13 cannot cool the coolant to a temperature lower than the temperature of the outside air, whereas the coolant cooler 14 can cool the coolant to a temperature lower than the outside air temperature.

The cooler core 16 and the heater core 17 are heat-medium air heat exchangers that exchange heat between the coolant having its temperature adjusted by the coolant cooler 14 and the coolant heater 15 and ventilation air to be blown into the vehicle interior, thereby adjusting the temperature of the ventilation air. The cooler core 16 and the heater core 17 are heat-medium circulation devices through which the heat medium circulates.

The cooler core 16 is an air cooling heat exchanger that cools ventilation air into the vehicle interior by exchanging heat between the coolant and the ventilation air into the vehicle interior. The cooler core 16 exchanges sensible heat between the coolant and the ventilation air into the vehicle interior. The heater core 17 is an air heating heat exchanger that heats ventilation air into the vehicle interior by exchanging heat (exchanging sensible heat) between the coolant and the ventilation air into the vehicle interior. The heater core 17 exchanges sensible heat between the coolant and the ventilation air into the vehicle interior.

The first pump 11 is disposed in a first pump flow passage 31. The coolant cooler 14 is disposed on the discharge side of the first pump 11 in the first pump flow passage 31.

The second pump 12 is disposed in a second pump flow passage 32. The coolant heater 15 is disposed on the discharge side of the second pump 12 in the second pump flow passage 32.

The radiator 13 is disposed in a radiator flow passage 33. The cooler core 16 is disposed in a cooler core flow passage 36. The heater core 17 is disposed in a heater core flow passage 37.

The first pump flow passage 31, the second pump flow passage 32, and the radiator flow passage 33 are connected to the first switching valve 18 and the second switching valve 19. Each of the first and second switching valves 18 and 19 is a switching portion that switches the flow of the coolant.

The first switching valve 18 has a first inlet 18a and a second inlet 18b as the inlet for the coolant. The first switching valve 18 has a first outlet 18c as the outlet for the coolant. The second switching valve 19 has a first outlet 19a and a second outlet 19b as the outlet for the coolant. The second switching valve 19 has a first inlet 19c as the inlet for the coolant.

The first inlet 18a of the first switching valve 18 is connected to one end of the first pump flow passage 31. For example, the first inlet 18a of the first switching valve 18 is connected to the coolant outlet side of the coolant cooler 14.

The second inlet 18b of the first switching valve 18 is connected to one end of the second pump flow passage 32. For example, the second inlet 18b of the first switching valve 18 is connected to the coolant outlet side of the coolant heater 15.

The first outlet 18c of the first switching valve 18 is connected to one end of the radiator flow passage 33. For example, the first outlet 18c of the first switching valve 18 is connected to the coolant inlet side of the radiator 13.

The first outlet 19a of the second switching valve 19 is connected to the other end of the first pump flow passage 31. For example, the first outlet 19a of the second switching valve 19 is connected to the coolant suction side of the first pump 11.

The second outlet 19b of the second switching valve 19 is connected to the other end of the second pump flow passage 32. For example, the second outlet 19b of the second switching valve 19 is connected to the coolant suction side of the second pump 12.

The first inlet 19c of the second switching valve 19 is connected to the other end of the radiator flow passage 33. For example, the first inlet 19c of the second switching valve 19 is connected to the coolant outlet side of the radiator 13.

The first switching valve 18 and the second switching valve 19 can be configured to arbitrarily or selectively switch the communication state between each inlet and outlet.

The cooler core 16 and the heater core 17 are accommodated in a case 51 of an interior air conditioning unit 50 in the vehicle air conditioner.

The case 51 forms an air passage for the ventilation air to be blown into the vehicle interior. The case 51 is molded of resin (for example, polypropylene) with some elasticity and excellent strength. An inside/outside air switching box 52 is disposed at the most upstream side of an air flow in the case 51. The inside/outside air switching box 52 is an inside/outside air introduction portion that switches between the air in the vehicle interior (hereinafter referred to as an inside air) and the outside air to introduce the switched air thereinto.

The inside/outside air switching box 52 is provided with an inside-air suction port 52a for introducing the inside air into the case 51, and an outside-air suction port 52b for introducing the outside air into the case 51. An inside/outside air switching door 53 is disposed inside the inside/outside air switching box 52.

The inside/outside air switching door 53 serves as an air-volume ratio changing portion that changes the ratio of the volume of the inside air to that of the outside air to be introduced into the case 51. Specifically, the inside/outside air switching door 53 continuously adjusts the opening areas of the inside-air suction port 52a and the outside-air suction port 52b, thereby changing the ratio of the volume of the inside air to that of the outside air. The inside/outside air switching door 53 is driven by an electric actuator (not shown).

An interior blower (for example, blower) 54 is disposed on the air-flow downstream side of the inside/outside air switching box 52. The interior blower 54 is a blower that blows air (i.e., inside air and outside air) drawn via the inside/outside air switching box 52, into the vehicle interior. The interior blower 54 is an electric blower that includes a centrifugal multiblade fan (for example, sirocco fan) to be driven by an electric motor.

The cooler core 16 and the heater core 17 are disposed on the air-flow downstream side of the interior blower 54 in the case 51.

A heater-core bypass passage 51a is formed at the air-flow downstream side part of the cooler core 16 within the case 51. The heater-core bypass passage 51a is an air passage that allows the air having passed through the cooler core 16 to flow bypassing the heater core 17.

An air mix door 55 is disposed between the cooler core 16 and the heater core 17 within the case 51.

The air mix door 55 serves as an air-volume ratio adjustment portion that continuously changes the ratio of the volume of the air flowing into the heater core 17 to the volume of the air flowing into the heater-core bypass passage 51a. The air mix door 55 is, for example, a rotatable plate-shaped door, a slidable door, or the like, and is driven by an electric actuator (not shown).

The temperature of blown air, which is to be blown into the vehicle interior, is changed by the ratio of the volume of the air passing through the heater core 17 to the volume of the air passing through the heater-core bypass passage 51a. Thus, the air mix door 55 serves as a temperature adjustment portion to adjust the temperature of the blowout air to be blown into the vehicle interior.

An air outlet 51b for blowing the ventilation air into the vehicle interior as a space to be air-conditioned is disposed at the most downstream side of the air flow with respect to the case 51. Specifically, a defroster air outlet, a face air outlet, and a foot air outlet are provided as the air outlet 51b.

The defroster air outlet blows the conditioned air toward the inner surface of a windshield of the vehicle. The face air outlet blows the conditioned air toward the upper body of an occupant. The foot air outlet blows the conditioned air toward the feet of the occupant.

An air-outlet mode door (not shown) is disposed on the air-flow upstream side of the air outlet 51b. The air-outlet mode door serves as an air-outlet mode switch for switching the air outlet mode. The air-outlet mode door is driven by an electric actuator (not shown).

The air outlet modes switched by the air-outlet mode door include, for example, a face mode, a bi-level mode, a foot mode, and a foot-defroster mode.

The face mode is an air outlet mode in which the face air outlet is fully opened to blow the air from the face air outlet toward the upper body of the occupant in the vehicle cabin. The bi-level mode is an air outlet mode in which both the face air outlet and foot air outlet are opened to blow air toward the upper body and feet of the occupant in the vehicle cabin.

The foot mode is an air outlet mode in which the foot air outlet is fully opened with the defroster air outlet opened only by a small opening degree to blow the air mainly from the foot air outlet. The foot-defroster mode is an air outlet mode in which the foot air outlet and the defroster air outlet are opened by the same degree to blow the air from both the foot air outlet and the defroster air outlet.

The thermal management system 10 further includes vehicle-mounted devices 81A, 81B, and 81C. The vehicle-mounted devices 81A, 81B, and 81C are a battery-temperature adjustment heat exchanger 81A, an inverter 81B, and an engine cooling heat exchanger 81C. The battery-temperature adjustment heat exchanger 81A, the inverter 81B, and the engine cooling heat exchanger 81C serve as heat transfer devices that have flow passages in which the coolant circulates and transfers heat to and from the coolant. The battery-temperature adjustment heat exchanger 81A, the inverter 81B, and the engine cooling heat exchanger 81C also serve as heat generating devices that generate heat during their operations.

The battery-temperature adjustment heat exchanger 81A is a heat exchanger disposed in a ventilation-air route to the battery and configured to exchange heat between the ventilation air and the coolant. The battery-temperature adjustment heat exchanger 81A is disposed in a battery heat-exchange flow passage 80A.

One end of the battery heat-exchange flow passage 80A is connected to a battery heat-exchange outlet 18f of the first switching valve 18. The other end of the battery heat-exchange flow passage 80A is connected to a battery heat-exchange inlet 19f of the second switching valve 19.

The inverter 81B is a power converter that converts a direct-current (DC) power supplied from the battery into an alternating-current (AC) voltage to output the AC voltage to the traveling electric motor. The inverter 81B is disposed in an inverter flow passage 80B.

One end of the inverter flow passage 80B is connected to an inverter outlet 18g of the first switching valve 18. The other end of the inverter flow passage 80B is connected to an inverter inlet 19g of the second switching valve 19.

The engine cooling heat exchanger 81C is a heat exchanger (for example, a heat-medium heat-medium heat exchanger) that exchanges heat between the coolant in the thermal management system 10 (i.e., the coolant circulating by the first pump 11 or second pump 12) and the coolant (for example, an engine heat medium) in an engine cooling circuit 90. The engine cooling heat exchanger 81C is disposed in a heat exchanger flow passage 80C.

One end of the heat exchanger flow passage 80C is connected to a heat exchanger outlet 18h of the first switching valve 18. The other end of the heat exchanger flow passage 80C is connected to a heat exchanger inlet 19h of the second switching valve 19.

In the present embodiment, one end of the cooler core flow passage 36 is connected to a cooler core outlet 18i of the first switching valve 18. The other end of the cooler core flow passage 36 is connected to a cooler core inlet 19i of the second switching valve 19.

One end of a heater core flow passage 37 is connected to a heater core outlet 18j of the first switching valve 18. The other end of the heater core flow passage 37 is connected to a heater core inlet 19j of the second switching valve 19.

The first switching valve 18 switches among a state in which the coolant discharged from the first pump 11 flows, a state in which the coolant discharged from the second pump 12 flows, and a state in which the coolant discharged from the first pump 11 and the coolant discharged from the second pump 12 do not flow, with respect to each of the devices 13, 16, 17, 81A, 81B, and 81C connected to the outlet side of the first switching valve.

The second switching valve 19 switches among a state in which the coolant flows out to the first pump 11, a state in which the coolant flows out to the second pump 12, and a state in which the coolant flows out to neither the first pump 11 nor the second pump 12, with respect to each of the devices 13, 16, 17, 81A, 81B, and 81C connected to the inlet side of the second switching valve.

The first switching valve 18 and the second switching valve 19 are capable of adjusting their valve opening degrees. In this way, the flow rate of coolant flowing through each of the devices 13, 16, 17, 81A, 81B, and 81C can be adjusted.

The first switching valve 18 and the second switching valve 19 are capable of mixing the coolant discharged from the first pump 11 and the coolant discharged from the second pump 12 at any flow-rate ratio to cause the mixed coolant to flow into the respective devices 13, 16, 17, 81A, 81B, and 81C.

The engine cooling circuit 90 is a coolant circulation circuit for cooling an engine 91. The engine cooling circuit 90 includes a circulation flow passage 92 in which the coolant circulates. The circulation flow passage 92 is provided with the engine 91, a third pump 93, an engine radiator 94, and the engine cooling heat exchanger 81C.

The third pump 93 is an electric pump that draws and discharges the coolant. The third pump 93 may be a mechanical pump driven by power output from the engine 91.

The engine radiator 94 is a heat-dissipation heat exchanger that dissipates heat from the coolant into the outside air by exchanging heat between the coolant and the outside air.

The circulation flow passage 92 is connected to a radiator bypass flow passage 95. The radiator bypass flow passage 95 is a flow passage through which the coolant flows while bypassing the engine radiator 94.

A thermostat 96 is disposed in a connection portion between the radiator bypass flow passage 95 and the circulation flow passage 92. The thermostat 96 is a coolant-temperature responsive valve that is configured of a mechanical mechanism designed to open and close a coolant flow passage by displacing a valve body using a thermo wax (for example, thermo-sensitive member) that changes its volume depending on its temperature.

Specifically, when the temperature of the coolant exceeds a predetermined temperature (for example, 80° C. or higher), the thermostat 96 closes the radiator bypass flow passage 95. When the temperature of coolant is lower than the predetermined temperature (for example, lower than 80° C.), the thermostat 96 opens the radiator bypass flow passage 95.

The circulation flow passage 92 is connected to an engine-accessory flow passage 97. The engine-accessory flow passage 97 is a flow passage in which the coolant flows in parallel with the engine cooling heat exchanger 81C. Engine accessories 98 are disposed in the engine-accessory flow passage 97. The engine accessories 98 include an oil heat exchanger, an exhaust gas recirculation (EGR) cooler, a throttle cooler, a turbo cooler, an engine-accessory motor, and the like. The oil heat exchanger is a heat exchanger that adjusts the temperature of oil by exchanging heat between the coolant and the engine oil or transmission oil.

The EGR cooler is a heat exchanger configuring an EGR device (i.e., exhaust gas recirculation device) that refluxes part of exhaust gas from the engine into the intake side to reduce pumping loss caused by a throttle valve. Specifically, the EGR cooler is a heat exchanger that exchanges heat between the reflux gas and the coolant to thereby adjust the temperature of the reflux gas.

The throttle cooler is a water jacket provided inside a throttle to cool the throttle valve.

The turbo cooler is a cooler that cools a turbo charger by exchanging heat between heat generated by the turbo charger and the coolant.

The engine-accessory motor is a large-sized motor for rotating an engine belt even while stopping the engine. The engine-accessory motor is used to operate the compressor, water pump, or the like, which is driven by the engine belt, even when no driving force from the engine is available, or upon start-up of the engine.

A first reserve tank 99 is connected to the engine radiator 94. The first reserve tank 99 is an air release container for storing the coolant therein. Thus, the pressure at the liquid surface of the coolant stored in the first reserve tank 99 becomes atmospheric pressure. The first reserve tank 99 may be configured such that the pressure at the liquid surface of the coolant stored in the first reserve tank 99 becomes a predetermined pressure that is different from the atmospheric pressure.

An excess coolant is stored in the first reserve tank 99, which can suppress the decrease in liquid amount of the coolant circulating through the respective flow passages. The first reserve tank 99 has the function of separating air bubbles mixed in the coolant, into gas and liquid.

A second reserve tank 100 is connected to the radiator flow passage 33. The structure and function of the second reserve tank 100 are substantially the same as those of the first reserve tank 99.

An auxiliary heater 101 is disposed at an air-flow downstream side part of the heater core 17 within the case 51 of the interior air conditioning unit 50 of the vehicle air conditioner. The auxiliary heater 101 has a PTC element (for example, a positive thermistor), and is a PTC heater (for example, an electric heater) that heats the air by generating heat though supply of the electric power to the PTC element. The operation of the auxiliary heater 101 (for example, the amount of generated heat) is controlled by a controller 60.

The refrigeration cycle 21 includes an internal heat exchanger 102. The internal heat exchanger 102 is a heat exchanger that exchanges heat between the refrigerant flowing out of the coolant heater 15 and the refrigerant flowing out of the coolant cooler 14.

Figure 2:
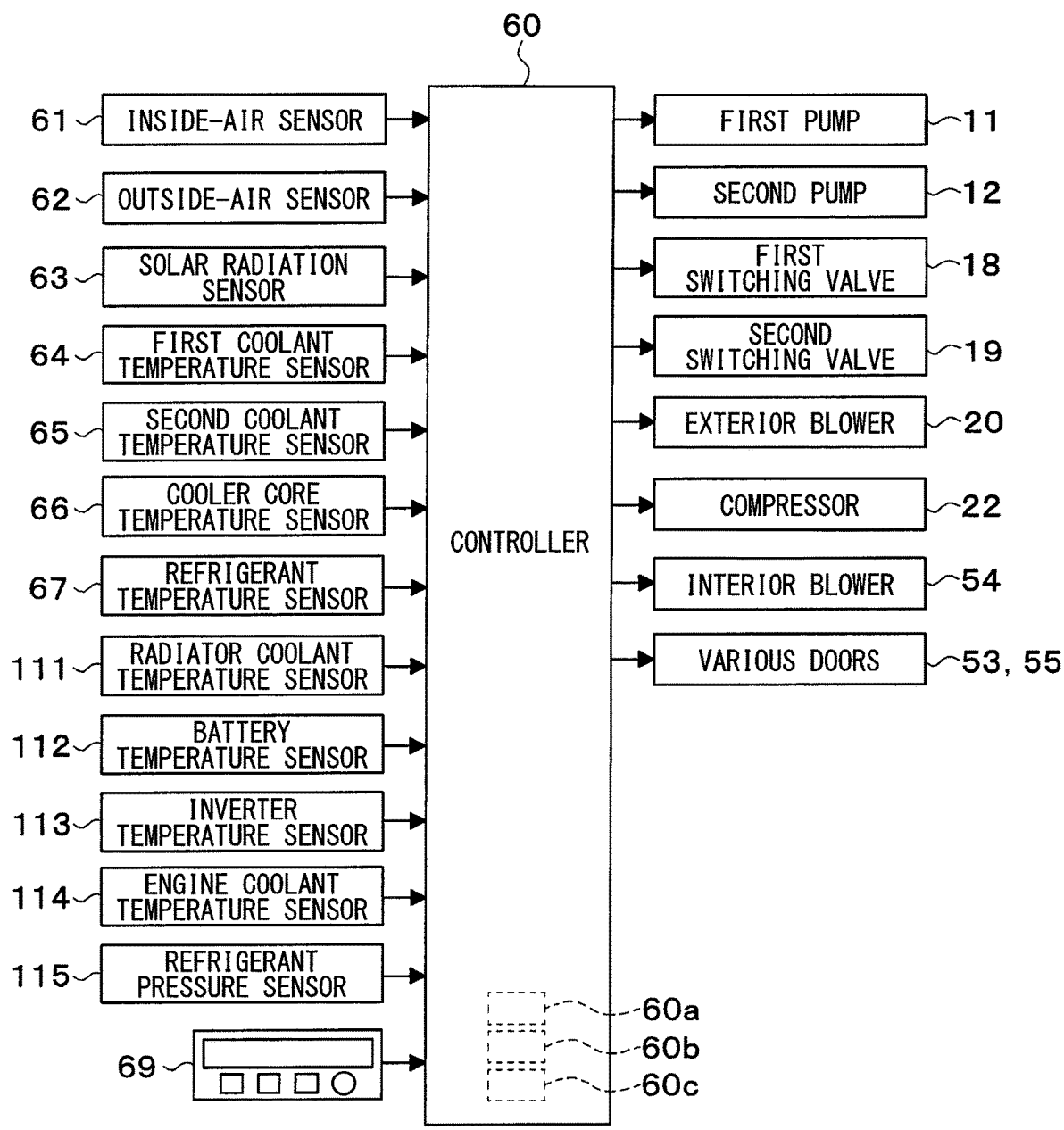
FIG. 2 is a block diagram showing an electric controller in the vehicle thermal management system of the embodiment.

Next, an electric controller of the thermal management system 10 will be described with reference to FIG. 2. The controller 60 is comprised of a known microcomputer, such as CPU, ROM, and RAM, and a peripheral circuit thereof. The controller 60 is a controller that performs various computations and processing based on air-conditioning control programs stored in the ROM to thereby control the operations of various control target devices that are connected to its output side.

The control target devices to be controlled by the controller 60 include the first pump 11, the second pump 12, the first switching valve 18, the second switching valve 19, the exterior blower 20, the compressor 22, the interior blower 54, and the electric actuator for driving various doors disposed in the case 51 (for example, the inside/outside air switching door 53, air mix door 55, air-outlet mode door, and the like).

The controller 60 incorporates therein control units for controlling various control target devices connected to its output side. The hardware and software of the controller 60 that control the operation of each control target device configure the control unit that controls the operation of each of the control target devices.

The hardware and software of the controller 60 for controlling the operations of the first pump 11 and the second pump 12 are configured as a pump control unit 60a. The pump control unit 60a is a flow rate control unit for controlling the flow rate of the coolant flowing through the radiator 13. The pump control unit 60a may be configured separately from the controller 60.

The hardware and software of the controller 60 for controlling the operations of the first switching valve 18 and the second switching valve 19 are configured as a switching valve control unit 60b. The switching valve control unit 60b is a flow rate control unit that adjusts the flow rate of the coolant flowing through the radiator 13. The switching valve control unit 60b may be configured separately from the controller 60.

The hardware and software of the controller 60 for controlling the operation of the compressor 22 are configured as a compressor control unit 60c. The compressor control unit 60c is a refrigerant flow rate adjustment portion that controls the flow rate of refrigerant discharged from the compressor 22. The compressor control unit 60c may be configured separately from the controller 60.

Detection signals from a group of sensors are input to the input side of the controller 60. The group of sensors includes an inside-air sensor 61, an outside-air sensor 62, a solar radiation sensor 63, a first coolant temperature sensor 64, a second coolant temperature sensor 65, a cooler core temperature sensor 66, a refrigerant temperature sensor 67, a radiator coolant temperature sensor 111, a battery temperature sensor 112, an inverter temperature sensor 113, an engine coolant temperature sensor 114, and a refrigerant pressure sensor 115.

The inside-air sensor 61 is an inside-air temperature detector that detects the temperature of the inside air. The outside-air sensor 62 is an outside-air temperature detector that detects the temperature of the outside air. The solar radiation sensor 63 is a solar radiation amount detector that detects the amount of solar radiation received in the vehicle interior.

The first coolant temperature sensor 64 is a first coolant temperature detector that detects the temperature of coolant flowing through the first pump flow passage 31 (for example, the temperature of the coolant drawn into the first pump 11).

The second coolant temperature sensor 65 is a second coolant temperature detector that detects the temperature of coolant flowing through the second pump flow passage 32

(for example, the temperature of the coolant drawn into the second pump 12). The second coolant temperature sensor 65 is a detector that detects a physical quantity in relation to a temperature Th of the coolant circulating through the coolant heater 15.

The cooler core temperature sensor 66 is a cooler core temperature detector that detects the surface temperature of the cooler core 16. The cooler core temperature sensor 66 is, for example, a fin thermistor for detecting the temperature of a heat exchange fin in the cooler core 16, a coolant temperature sensor for detecting the temperature of the coolant flowing through the cooler core 16, or the like.

The refrigerant temperature sensor 67 includes a discharge-side refrigerant temperature sensor 67A and a suction-side refrigerant temperature sensor 67B. The discharge-side refrigerant temperature sensor 67A is a refrigerant temperature detector that detects the temperature of the refrigerant discharged from the compressor 22. The suction-side refrigerant temperature sensor 67B is a refrigerant temperature detector that detects the temperature of the refrigerant drawn into the compressor 22.

The radiator coolant temperature sensor 111 is a coolant temperature detector that detects the temperature of the coolant flowing through the radiator flow passage 33 (for example, the temperature of the coolant flowing out of the radiator 13).

The battery temperature sensor 112 is a battery-temperature detector that detects the temperature of the coolant flowing through the battery heat-exchange flow passage 80A (for example, the temperature of the coolant flowing into the battery-temperature adjustment heat exchanger 81A).

The inverter temperature sensor 113 is an inverter temperature detector that detects the temperature of the coolant flowing through the inverter flow passage 80B (for example, the temperature of the coolant flowing out of the inverter 81B).

The engine coolant temperature sensor 114 is a coolant temperature detector that detects the temperature of the coolant circulating in the engine cooling circuit 90 (for example, the temperature of the coolant flowing through the inside of the engine 91).

The refrigerant pressure sensor 115 includes a discharge-side refrigerant pressure sensor 115A and a suction-side refrigerant pressure sensor 115B. The discharge-side refrigerant pressure sensor 115A is a refrigerant pressure detector that detects the pressure of the refrigerant discharged from the compressor 22. The suction-side refrigerant pressure sensor 115B is a refrigerant pressure detector that detects the pressure of the refrigerant drawn into the compressor 22.

An operation panel 69 is disposed near the instrument board at the front of the inside of the vehicle cabin. Operation signals from various types of air-conditioning operation switches provided on the operation panel 69 are input to the input side of the controller 60. Various types of air-conditioning operation switches provided on the operation panel 69 include an air conditioner switch, an automatic switch, an air volume setting switch for the interior blower 54, a vehicle-interior temperature setting switch, and the like.

The air conditioner switch is a switch that switches between operating and stopping (in other words, on and off) of air conditioning (i.e., air-cooling or air-heating). The automatic switch is a switch that sets or cancels automatic control of the air conditioning. The vehicle-interior temperature setting switch is a target temperature setting portion for setting a target vehicle interior-temperature by the occupant's operation.

Next, the operation of the above-mentioned configuration will be described. The controller 60 operates the first switching valve 18 and the second switching valve 19 to switch the mode of a coolant flow to one of various modes shown in FIGS. 3 to 7. For ease of understanding, the thermal management system 10 is simplified in FIGS. 3 to 7.

Figure 3:
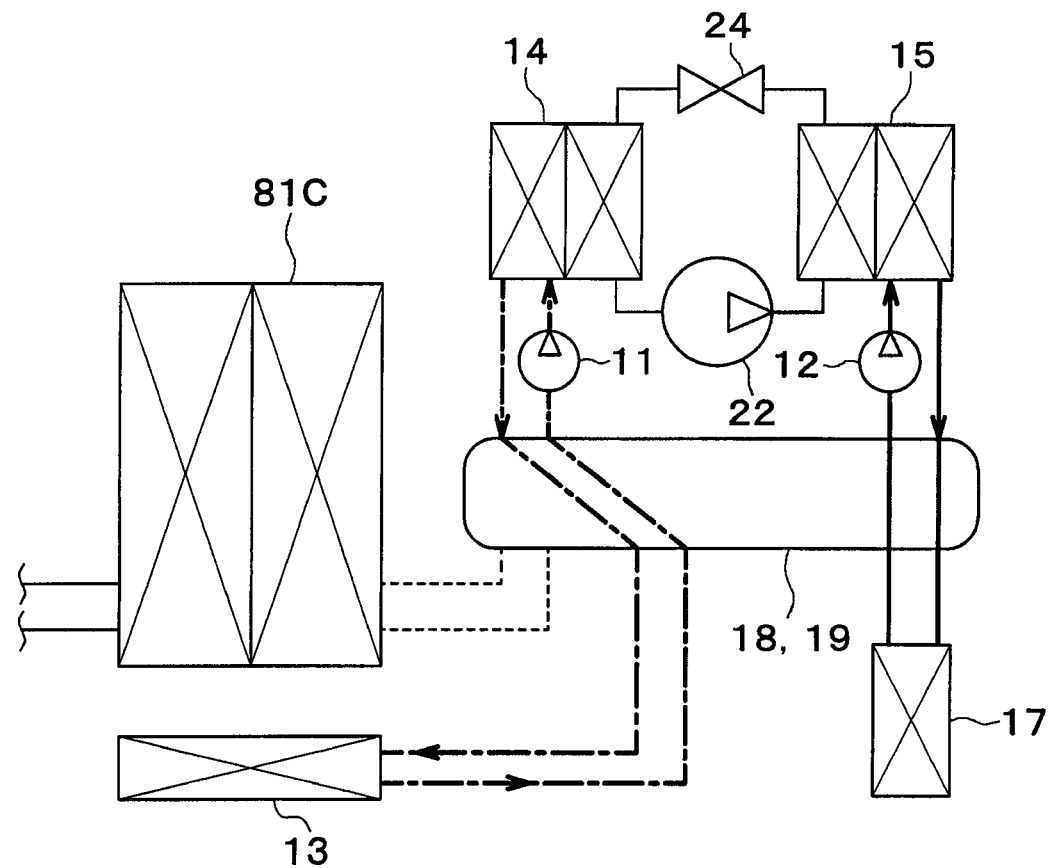
FIG. 3 is a schematic configuration diagram showing an outside-air heat absorption heat pump mode of the vehicle thermal management system in the embodiment.

In the outside-air heat absorption heat pump mode shown in FIG. 3, the radiator 13 is connected to the coolant cooler 14, the heater core 17 is connected to the coolant heater 15, and the engine cooling heat exchanger 81C is connected to neither the coolant cooler 14 nor the coolant heater 15.

Thus, the coolant at a lower temperature than the outside air temperature, cooled by the coolant cooler 14, is caused to flow through the radiator 13, so that the heat is absorbed from the outside air into the coolant in the radiator 13, and the coolant heated by the coolant heater 15 flows through the heater core 17, thereby heating the ventilation air into the vehicle interior in the heater core 17.

That is, in the outside-air heat absorption heat pump mode, the refrigerant in the refrigeration cycle 21 absorbs heat from the outside air in the radiator 13 and dissipates heat into the coolant in the coolant heater 15. Therefore, a heat-pump operation for pumping up the heat from the outside air can be achieved.

Figure 4:
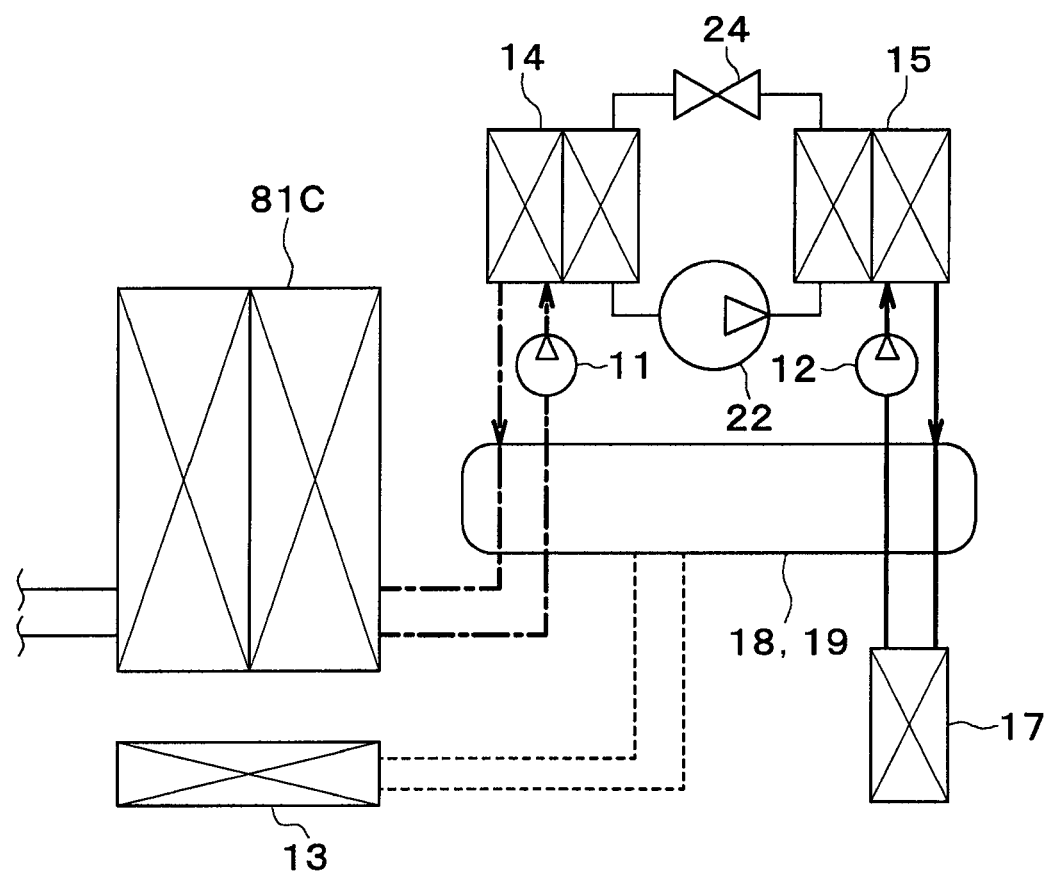
FIG. 4 is a schematic configuration diagram showing an engine heat absorption heat pump mode of the vehicle thermal management system in the embodiment.

In the engine heat absorption heat pump mode shown in FIG. 4, the engine cooling heat exchanger 81C is connected to the coolant cooler 14, the heater core 17 is connected to the coolant heater 15, and the radiator 13 is connected to neither the coolant cooler 14 nor the coolant heater 15.

Thus, the coolant heated by the engine cooling heat exchanger 81C is caused to flow through the coolant cooler 14, so that the heat is absorbed into the refrigerant in the coolant cooler 14, and the coolant heated by the coolant heater 15 flows through the heater core 17, thereby heating the ventilation air into the vehicle interior in the heater core 17.

That is, in the engine heat absorption heat pump mode, the refrigerant in the refrigeration cycle 21 absorbs heat from the coolant heated in the engine cooling heat exchanger 81C and dissipates heat into the coolant in the coolant heater 15. Therefore, a heat-pump operation for pumping up the heat from the engine 91 can be achieved.

In the engine heat absorption heat pump mode, other vehicle-mounted devices 81A and 81B are connected to the coolant cooler 14, thereby making it possible to pump up heat from the other vehicle-mounted devices 81A and 81B. Thus, the engine heat absorption heat pump mode can be expressed as a device heat absorption heat pump mode.

Figure 5:
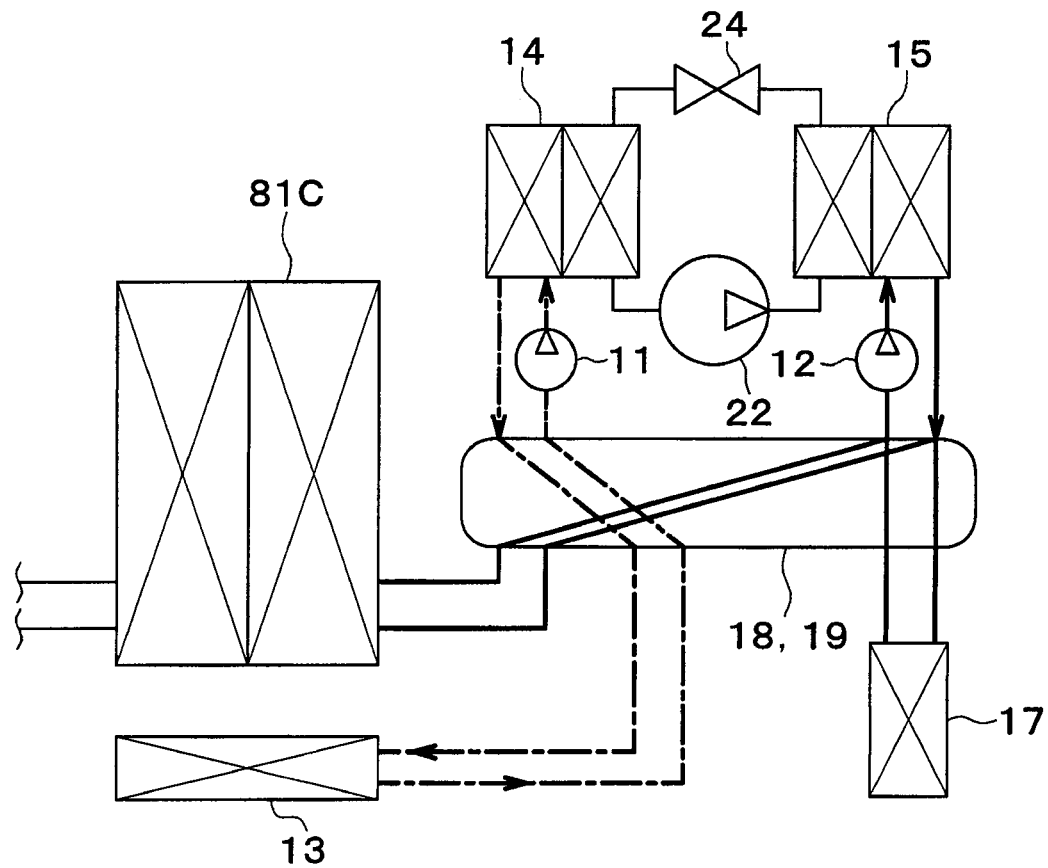
FIG. 5 is a schematic configuration diagram showing an assistance heat pump mode and the like of the vehicle thermal management system in the embodiment.

In the assistance heat pump mode, engine heating heat pump mode, device heating mode, and thermal mass usage cooling mode shown in FIG. 5, the engine cooling heat exchanger 81C and the heater core 17 are connected to the coolant heater 15, and the radiator 13 is connected to the coolant cooler 14.

Thus, the coolant heated by the engine cooling heat exchanger 81C is caused to flow through the heater core 17, whereby the ventilation air into the vehicle interior is heated by the heater core 17.

Further, the coolant cooled by the coolant cooler 14 is caused to flow through the radiator 13, so that the heat is absorbed from the outside air into the coolant in the radiator 13, and the coolant heated by the coolant heater 15 flows through the heater core 17, thereby heating the ventilation air into the vehicle interior in the heater core 17.

That is, in the assistance heat pump mode, engine heating heat pump mode, device heating mode, and thermal mass usage heating mode, the refrigerant in the refrigeration cycle 21 absorbs heat from the outside air in the radiator 13 and dissipates heat into the coolant in the coolant heater 15. Thus, a heat-pump operation for pumping up the heat from the outside air can be achieved.

Therefore, when the waste heat from the engine 91 becomes insufficient as an air-heating heat source, the assistance heat pump mode can be executed to compensate for the air-heating heat source through the heat-pump operation.

When warming up the engine 91, the engine heating heat pump mode is executed to cause the coolant heated by the coolant heater 15 to flow thorough the engine cooling heat exchanger 81C. Thus, the engine 91 can be heated with the coolant heated by the coolant heater 15.

In the engine heating heat pump mode, other vehicle-mounted devices 81A and 81B are connected to the coolant heater 15, so that the other vehicle-mounted devices 81A and 81B can be heated with the coolant heated by the coolant heater 15. Thus, the engine heating heat pump mode can be expressed as a device heating heat pump mode.

In the device heating mode, the other vehicle-mounted devices 81A and 81B connected to the coolant heater 15 can be heated with heat from the engine 91.

The thermal mass usage heating mode is executed to cause the coolant heated by the coolant heater 15 to flow thorough the engine cooling heat exchanger 81C, thereby making it possible to suppress fluctuations in the coolant temperature using the thermal mass (for example, thermal capacity) of the engine 91.

Figure 6:
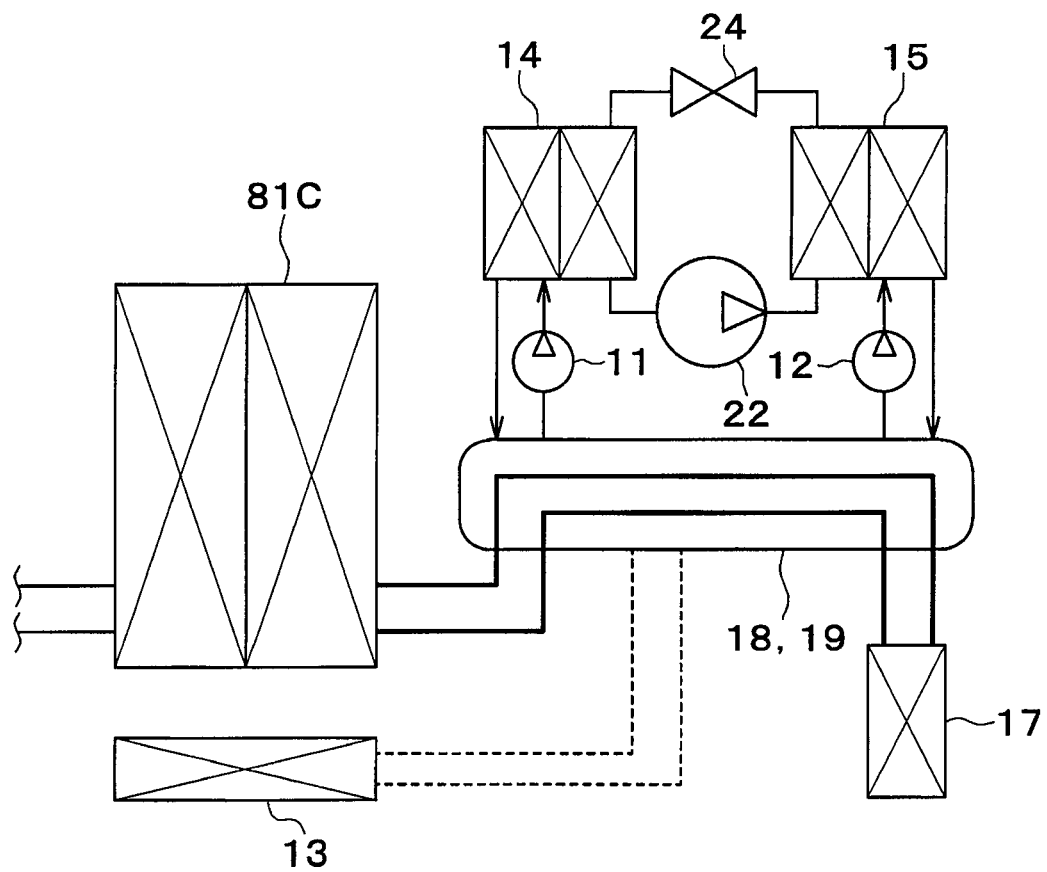
FIG. 6 is a schematic configuration diagram showing an engine waste heat direct usage mode of the vehicle thermal management system in the embodiment.

In the engine waste heat direct usage mode shown in FIG. 6, the engine cooling heat exchanger 81C and the heater core 17 are connected together, but connected to neither the coolant cooler 14 nor the coolant heater 15.

Although not shown, a coolant pump that draws and discharges the coolant is disposed in a coolant flow passage between the engine cooling heat exchanger 81C and the heater core 17. Thus, the coolant heated by the engine cooling heat exchanger 81C is caused to flow through the heater core 17, and thereby the ventilation air into the vehicle interior is heated by the heater core 17.

When the temperature of the coolant flowing through the heater core 17 exceeds the temperature required for air-heating of the vehicle interior, the engine cooling heat exchanger 81C is connected to the heater core 17 and the radiator 13, thereby enabling dissipation of excess heat of the engine 91 into the outside air.

In the engine waste heat direct usage mode, other heat generating devices (battery-temperature adjustment heat exchanger 81A and inverter 81B) are connected to the heater core 17, so that the coolant heated by the other heat generating devices 81A and 81B flow through the heater core 17, thereby enabling the heater core 17 to heat the ventilation air into the vehicle interior. Thus, the engine waste heat direct usage mode can be expressed as a device waste heat direct usage mode.

Figure 7:
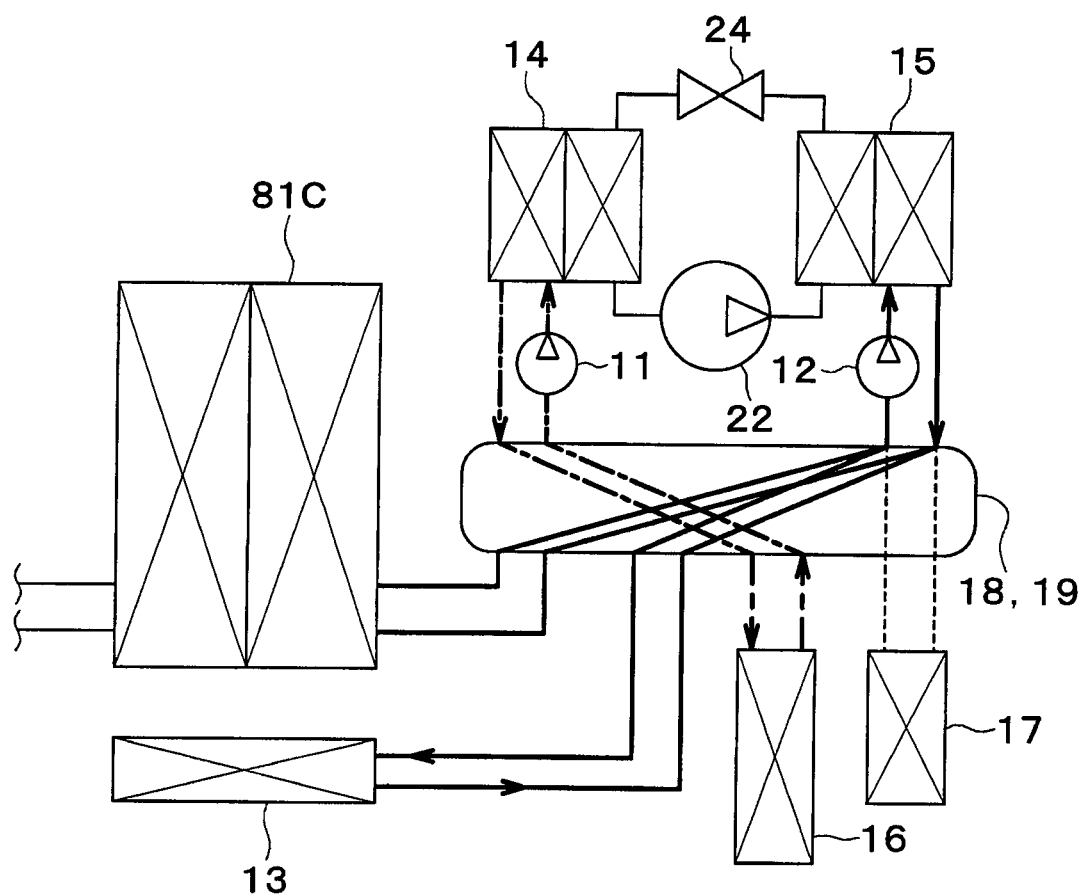
FIG. 7 is a schematic configuration diagram showing a thermal mass usage cooling mode of the vehicle thermal management system in the embodiment.

In the thermal mass usage cooling mode shown in FIG. 7, the engine cooling heat exchanger 81C and the radiator 13 are connected to the coolant heater 15, and the cooler core 16 is connected to the coolant cooler 14.

Thus, the coolant cooled by the coolant cooler 14 flows through the cooler core 16, so that the ventilation air into the vehicle interior is cooled by the cooler core 16. Meanwhile, the coolant heated by the coolant heater 15 flows through the radiator 13, so that the heat is dissipated from the coolant into the outside air in the radiator 13.

The coolant heated by the coolant heater 15 is caused to flow thorough the engine 91, thereby making it possible to suppress fluctuations in the coolant temperature using the thermal mass of the engine 91 and to suppress an increase in high pressure of the refrigerant by suppressing an increase in coolant temperature, thus achieving highly efficient air-cooling.

Although not shown, the controller 60 can operate the first switching valve 18 and the second switching valve 19 to switch the mode of a coolant flow to an engine independent mode.

In the engine independent mode, the engine cooling heat exchanger 81C is connected to neither the coolant cooler 14 nor the coolant heater 15. Thus, the waste heat from the engine 91 is transferred to neither of the coolant cooler 14 and the coolant heater 15.

For example, the engine independent mode is executed in an air-cooling operation when a temperature detected by the engine coolant temperature sensor 114, i.e., the temperature of the coolant circulating in the engine cooling circuit 90 exceeds a reference temperature previously set. Thus, the air-cooling performance can be prevented from deteriorating due to an influence of waste heat from the engine 91.

In the above-mentioned various modes, when the temperature of the coolant supplied to the radiator 13 is below a dew-point temperature, the condensed water in the radiator 13 is frozen to form frost. When frost is formed at the radiator 13, the amount of heat exchange in the radiator 13 is decreased. Because of this, defrosting becomes necessary for the radiator 13.

Figure 8:
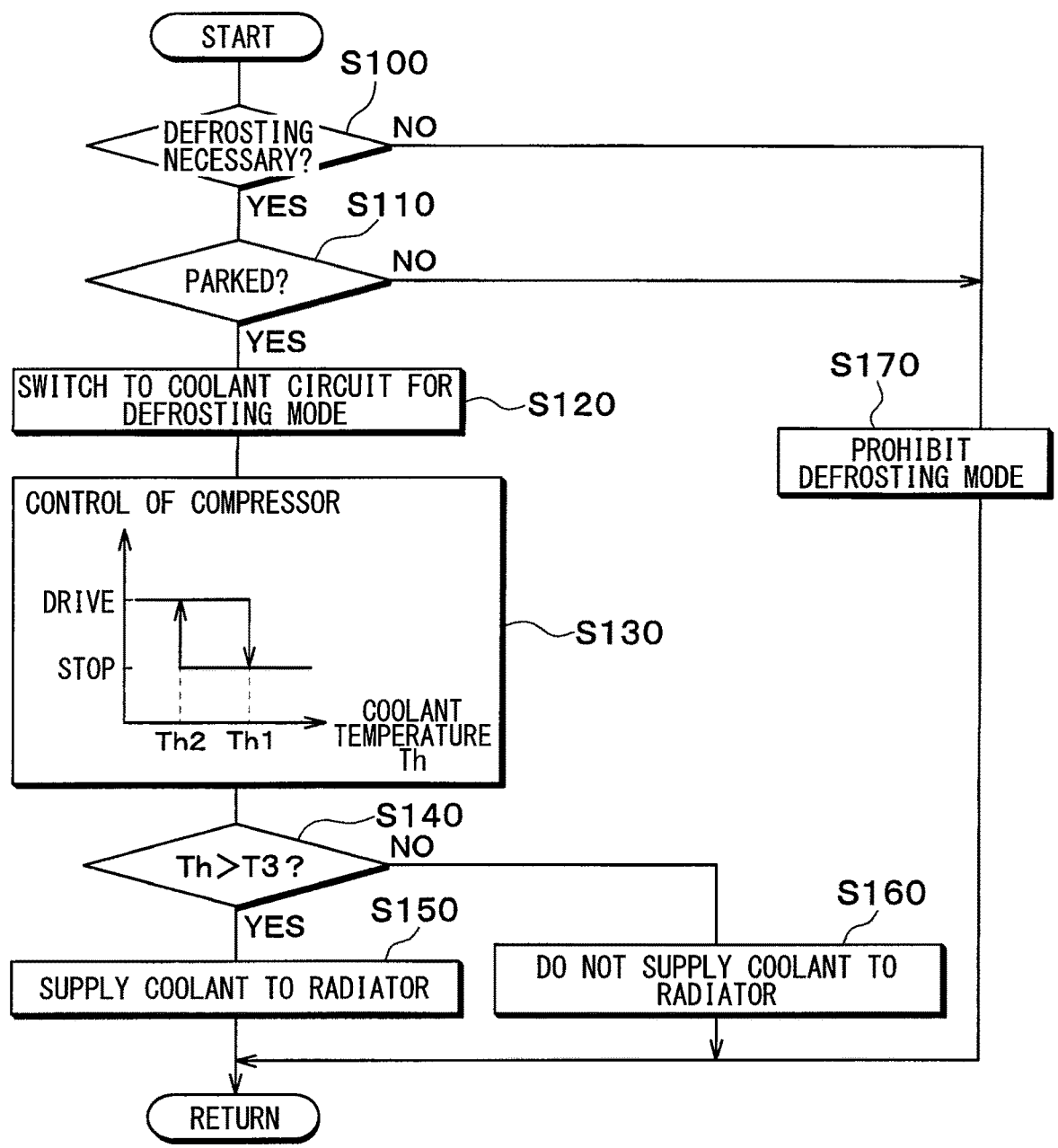
FIG. 8 is a flowchart showing control processing executed by a controller of the vehicle thermal management system in the embodiment.

Thus, the controller 60 executes the control processing shown in the flowchart of FIG. 8. The control processing shown in the flowchart of FIG. 8 is executed as a sub-routine with respect to the main routine of the thermal management system 10.

In step S100, it is determined whether or not the defrosting of the radiator 13 is necessary. In other words, it is determined whether or not frost is formed on the radiator 13.

For example, whether or not frost is formed on the radiator 13 is determined based on at least one of a traveling speed of a vehicle, the temperature of the coolant heat-exchanged in the coolant cooler 14, the pressure of the low-pressure side refrigerant in the refrigeration cycle 21, a time difference between a target air outlet temperature TAO of the ventilation air in the vehicle interior and an actual air outlet temperature TAV of the ventilation air in the vehicle interior, the temperature of the coolant heat-exchanged in the coolant heater 15, an on/off state of an ignition switch of the vehicle, and the like.

The target air outlet temperature TAO of the ventilation air in the vehicle interior is calculated, for example, using the following formula:

$$TAO = Kset \times Tset - Kr \times Tr - Kam \times Tam - Ks \times As + C$$

where Tset is a vehicle-interior preset temperature set by a vehicle-interior temperature setting switch; Tr is the temperature of the air in the vehicle interior (inside air temperature) detected by the inside-air sensor; Tam is an outside air temperature detected by the outside air sensor; As is a solar radiation amount detected by the solar radiation sensor; Kset, Kr, Kam, and Ks are control gains; and C is a constant for correction.

The actual air outlet temperature TAV of the ventilation air in the vehicle interior is calculated, for example, from the temperature of air flowing out of the heater core 17, an opening degree of the air mix door 55, and the like. A temperature sensor may be provided for detecting the actual air outlet temperature TAV of the ventilation air in the vehicle interior.

When defrosting of the radiator 13 is determined to be necessary in step S100, the processing proceeds to step S110 to determine whether the vehicle is parked or not. Specifically, it is determined whether the vehicle is parked or not, based on the state of the vehicle speed sensor or ignition switch.

Figure 9:
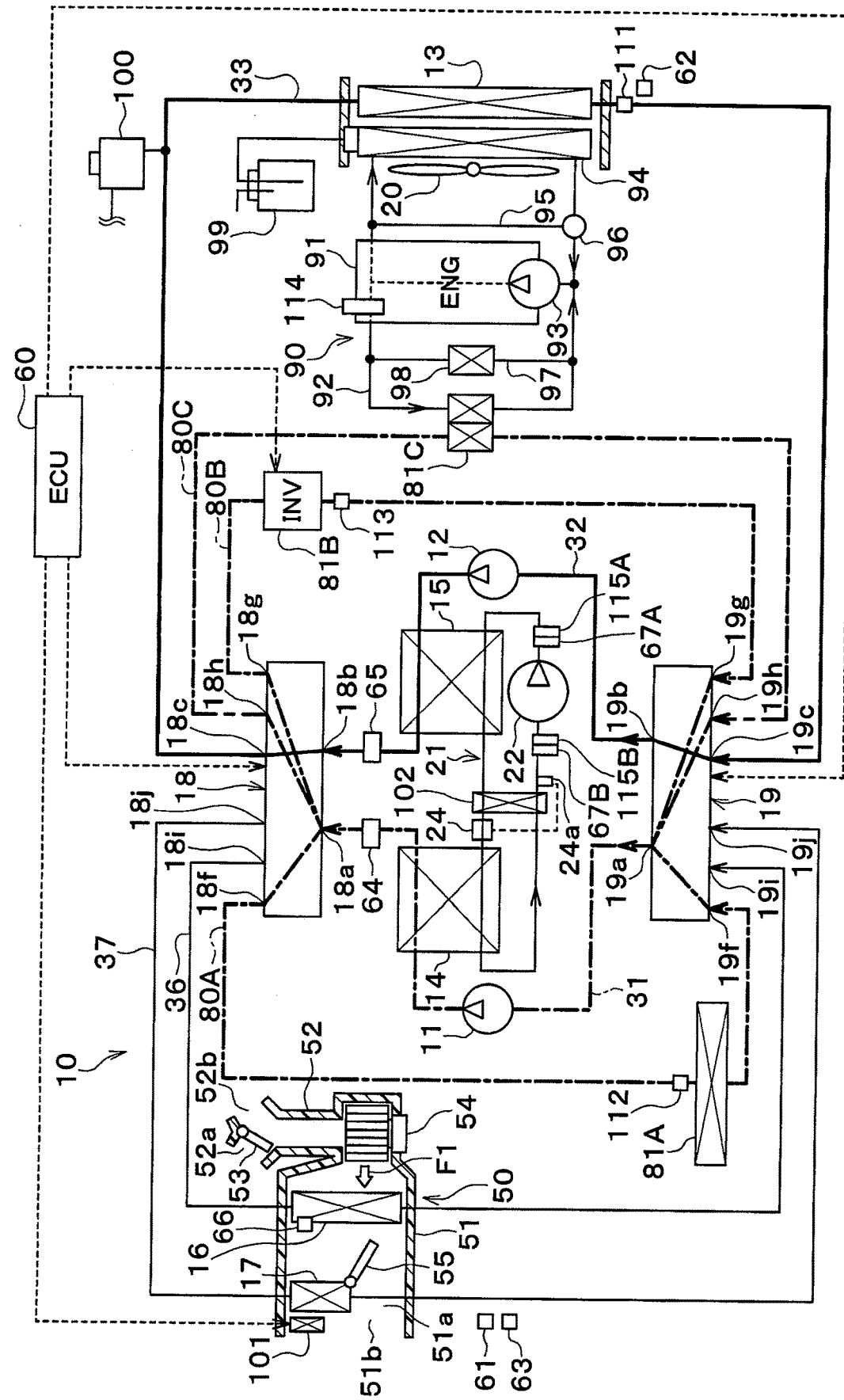
FIG. 9 is an entire configuration diagram showing an example of a defrosting mode of the vehicle thermal management system in the embodiment.

When the vehicle is determined to be parked in step S110, the processing proceeds to step S120, which is executed to switch to a coolant circuit in the defrosting mode shown in FIG. 9. Specifically, the operations of the first switching valve 18 and the second switching valve 19 are controlled such that the coolant circulates between the coolant heater 15 and the radiator 13 as indicated by a thick solid line of FIG. 9, and the coolant circulates between the coolant cooler 14 and at least one of the vehicle-mounted devices 81A, 81B, and 81C as indicated by thick alternate long and short dash lines of FIG. 9.

Hereinafter, a coolant circuit in which the coolant circulates between the coolant heater 15 and the radiator 13 refers to a high coolant temperature circuit. Further, hereinafter, a coolant circuit in which the coolant circulates between the coolant cooler 14 and at least one of the vehicle-mounted devices 81A, 81B, and 81C refers to a low coolant temperature circuit.

In subsequent step S130, the operation of the compressor 22 is controlled based on the coolant temperature Th in the high coolant temperature circuit. For example, the controller 60 uses the temperature of the coolant detected by the second coolant temperature sensor 65 as the coolant temperature Th in the high coolant temperature circuit.

Specifically, as shown in a control map of step S130 in FIG. 8, in a high temperature range of the coolant temperature Th, the compressor 22 is driven, while in a low temperature range of the coolant temperature Th, the compressor 22 is stopped. The control map of step S130 shown in FIG. 8 sets a hysteresis width for preventing control hunting.

Specifically, when the coolant temperature Th is raised from the low temperature range to the high temperature range, if the coolant temperature Th exceeds a first threshold value Th1, the compressor 22 is driven. When the coolant temperature Th is decreased from the high temperature range to the low temperature range, if the coolant temperature Th is below a second threshold value Th2, the compressor 22 is stopped. The first threshold value Th1 and the second threshold value Th2 are previously stored in the controller 60. The second threshold value Th2 is smaller than the first threshold value Th1. In the present embodiment, the first threshold value Th1 is a value equal to or higher than the freezing point (i.e., 0° C.) of pure water.

Thus, when the coolant temperature Th is low, the compressor 22 can be driven to increase the coolant temperature Th. That is, heat of at least one of the vehicle-mounted devices 81A, 81B, and 81C is pumped up from the side of the coolant cooler 14 to the side of the coolant heater 15 via the coolant in the low coolant temperature circuit, thereby enabling heat dissipation into the radiator 13 via the coolant in the high coolant temperature circuit. Consequently, the coolant temperature Th in the high coolant temperature circuit can be increased.

When the coolant temperature Th is high, the compressor 22 is stopped, thereby making it possible to prevent the compressor 22 from being excessively driven, further reducing the power consumption of the compressor 22.

In subsequent step S140, it is determined whether or not the coolant temperature Th in the high coolant temperature circuit exceeds a third threshold value Th3. The third threshold value Th3 is previously stored in the controller 60. In the present embodiment, the third threshold value Th3 is a set value equal to or higher than the freezing point (i.e., 0° C.) of pure water.

When the coolant temperature Th is determined to exceed the third threshold value Th3 in step S140, the processing proceeds to step S150, in which the operation of at least one of the first switching valve 18, the second switching valve 19, and the second pump 12 is controlled to supply the coolant to the radiator 13.

Thus, the coolant in the high coolant temperature circuit can be supplied to the radiator 13, thereby defrosting the radiator 13. When the compressor 22 is stopped in step S130, the radiator 13 is defrosted without consuming any power by the compressor 22. When the compressor 22 is driven in step S130, the radiator 13 can be defrosted using heat of at least one of vehicle-mounted devices 81A, 81B, and 81C, thereby making it possible to reduce the power consumed by the compressor 22.

When the coolant temperature Th is determined not to exceed the third threshold value Th3 in step S140, the processing proceeds to step S160, in which the operation of at least one of the first switching valve 18, the second switching valve 19, and the second pump 12 is controlled not to supply the coolant to the radiator 13.

Therefore, when the coolant temperature Th is below the third threshold value Th3, the flow rate of the coolant supplied from the coolant heater 15 to the radiator 13 becomes lower than that when the coolant temperature Th exceeds the third threshold value Th3.

Thus, when the coolant temperature Th is low, the supply of the coolant to the radiator 13 is suppressed until the coolant temperature Th is increased to some degree, so that the coolant temperature Th can be increased quickly to readily enhance the defrosting capacity.

When the defrosting is determined not to be necessary for the radiator 13 in step S100, or when the vehicle is determined not to be parked in step S110, the processing proceeds to step S170, which prohibits switching to the coolant circuit in the defrosting mode. In other words, switching is performed to any mode of the coolant flow other than the defrosting mode. Therefore, when defrosting of the radiator 13 is not necessary, or while the vehicle is traveling, the defrosting of the radiator 13 is not performed.

In the present embodiment, as explained in steps S100, S120, and S130, the controller 60 drives the compressor 22, while controlling the operations of the first switching valve 18 and the second switching valve 19 to switch to the defrosting mode in which the coolant circulates between the coolant cooler 14 and the vehicle-mounted devices 81A, 81B, and 81C, and the coolant circulates between the coolant heater 15 and the radiator 13, when defrosting of the radiator 13 is determined to be necessary.

Thus, heat of the vehicle-mounted devices 81A, 81B, and 81C is pumped up from the side of the coolant cooler 14 to the side of the coolant heater 15 via the coolant. Then, the heat can be dissipated into the radiator 13 via the coolant. Consequently, the radiator 13 can be defrosted using heat of the vehicle-mounted devices 81A, 81B, and 81C. Therefore, the defrosting can be performed on the radiator 13, while reducing the power consumption in the compressor 22.

In the present embodiment, as mentioned in step S120, the controller 60 controls the operations of the first switching valve 18 and the second switching valve 19 such that the coolant circulates between the coolant cooler 14 and the cooler core 16 when defrosting of the radiator 13 is determined to be necessary.

Thus, excess heat in the vehicle interior can be used as a heat source for defrosting of the radiator 13. In the defrosting mode, the ventilation air into the vehicle interior can be cooled to dehumidify the vehicle interior.

In the present embodiment, as mentioned in step S120, the controller 60 controls the operations of the first switching valve 18 and the second switching valve 19 such that the coolant circulates between the coolant heater 15 and the heater core 17 when defrosting of the radiator 13 is determined to be necessary.

Thus, the temperature of the heater core 17 can be adjusted by the coolant heat-exchanged in the coolant heater 15, while defrosting the radiator 13. That is, the vehicle interior can be heated while defrosting the radiator 13.

In the present embodiment, as mentioned in step S130, the controller 60 controls the operation of the compressor 22 based on the coolant temperature detected by the second coolant temperature sensor 65 when defrosting of the radiator 13 is determined to be necessary.

Thus, the operation of the compressor 22 can be controlled depending on the temperature of the coolant supplied to the radiator 13, so that the defrosting can be performed on the radiator 13, while reducing the power consumption in the compressor 22.

In the present embodiment, as mentioned in step S130, in a case where the defrosting of the radiator 13 is determined to be necessary, the controller 60 stops the compressor 22 when the temperature of the coolant circulating through the coolant heater 15 is determined to exceed the first threshold value Th1 based on the coolant temperature detected by the second coolant temperature sensor 65.

Thus, the radiator 13 is defrosted by using the heat contained in the coolant that circulates in the coolant heater 15, without driving the compressor 22, thereby making it possible to further reduce the power consumption in the compressor 22.

In the present embodiment, the first threshold value Th1 is a value equal to or higher than the freezing point of pure water. Thus, the radiator 13 can be surely defrosted by using the heat contained in the coolant that circulates in the coolant heater 15.

In the present embodiment, as mentioned in step S130, the controller 60 stops the compressor 22 when the temperature of the coolant circulating through the coolant heater 15 is determined to increase and exceed the first threshold value Th1 based on the coolant temperature detected by the second coolant temperature sensor 65. The controller 60 drives the compressor 22 when the temperature of the coolant circulating through the coolant heater 15 is determined to decrease and be below the second threshold value Th2 based on the coolant temperature detected by the second coolant temperature sensor 65.

Thus, the radiator 13 can be defrosted by using the heat contained in the coolant that circulates in the coolant heater 15, without driving the compressor 22, when the temperature of the coolant circulating through the coolant heater 15 is high. When the amount of heat contained in the coolant circulating through the coolant heater 15 becomes less, the compressor 22 is driven, so that the radiator 13 can be defrosted by using the heat contained in the vehicle-mounted devices 81A, 81B, and 81C.

In the present embodiment, as mentioned in steps S140 to S160, in a case where defrosting of the radiator 13 is determined to be necessary, the controller 60 controls the operation of at least one of the first switching valve 18, the second switching valve 19, and the second pump 12. Specifically, the controller 60 performs the controlling to lessen the flow rate of the coolant supplied from the coolant heater 15 to the radiator 13 when the temperature of the coolant circulating through the coolant heater 15 is determined to be below the third threshold value Th3 based on the coolant temperature detected by the second coolant temperature sensor 65, as compared to when the temperature of the coolant circulating through the coolant heater 15 is determined to exceed the third threshold value Th3 based on the coolant temperature detected by the second coolant temperature sensor 65.

With this configuration, when the defrosting capacity is low because the temperature Th of the coolant circulating through the coolant heater 15 is low, the heat dissipation at the radiator 13 is suppressed. Consequently, the temperature Th of the coolant circulating through the coolant heater 15 can be increased as quickly as possible to enhance the defrosting capacity.

In the present embodiment, the third threshold value Th3 is a value equal to or lower than the first threshold value. Thus, after the temperature Th of the coolant circulating through the coolant heater 15 is increased to enhance the defrosting capacity, the compressor 22 can be stopped. Consequently, the defrosting of the radiator 13 can be surely achieved, while suppressing the power consumed by the compressor 22.

The third threshold value Th3 is preferably equal to the first threshold value Th1. This is because the compressor 22 can be stopped immediately after the temperature Th of the coolant circulating through the coolant heater 15 is increased to enhance the defrosting capacity, thereby making it possible to defrost the radiator 13 while reducing the power consumption in the compressor 22 as much as possible.

In the present embodiment, as mentioned in steps S140 to S160, in a case where the defrosting of the radiator 13 is determined to be necessary, the controller 60 controls the operation of at least one of the first switching valve 18, the second switching valve 19, and the second pump 12 to stop the supply of the coolant from the coolant heater 15 to the radiator 13 when the temperature of the coolant circulating through the coolant heater 15 is determined to be below the third threshold value Th3 based on the coolant temperature detected by the second coolant temperature sensor 65. The controller 60 controls the operation of at least one of the first switching valve 18, the second switching valve 19, and the second pump 12 to supply the coolant from the coolant heater 15 to the radiator 13 when the temperature of the coolant circulating through the coolant heater 15 is determined to exceed the third threshold value Th3 based on the coolant temperature detected by the second coolant temperature sensor 65.

With this configuration, when the defrosting capacity is low because the temperature Th of the coolant circulating through the coolant heater 15 is low, the heat dissipation at the radiator 13 is further suppressed. Consequently, the temperature Th of the coolant circulating through the coolant heater 15 can be increased as quickly as possible to enhance the defrosting capacity.

In the present embodiment, the third threshold value Th3 is a value equal to or higher than the freezing point of pure water. Thus, the heat dissipation of the radiator 13 can be suppressed when the defrosting operation is impossible.

In the present embodiment, the vehicle-mounted devices 81A, 81B, and 81C are devices that generate heat during their operations. As the radiator 13 can be defrosted by effectively using waste heat from the vehicle-mounted devices 81A, 81B, and 81C, the defrosting capacity of the radiator 13 can be enhanced, while reducing the power consumption in the compressor 22.

In the present embodiment, as mentioned in steps S110 and S170, the controller 60 controls the operations of the first switching valve 18 and the second switching valve 19 in such a manner as to prohibit the execution of the defrosting mode while the vehicle is traveling, even when the defrosting of the radiator 13 is determined to be necessary.

Thus, the defrosting is not performed during traveling, thereby preventing heat generated in the coolant heater 15 from being dissipated into the outside by the traveling air in the radiator 13 to reduce the defrosting performance.

OTHER EMBODIMENTS

Various modifications and changes can be made to the above-mentioned embodiments, for example, in the following way.

(1) In the above-mentioned embodiments, the controller 60 uses the temperature of the coolant detected by the second coolant temperature sensor 65 as the coolant temperature Th in the high coolant temperature circuit. Alternatively, the controller 60 may estimate the coolant temperature Th in the high coolant temperature circuit based on a physical quantity in relation to the temperature of the coolant circulating through the coolant heater 15.

(2) In the above-mentioned embodiments, the controller 60 causes the coolant to be supplied to the radiator 13 in step S150, but causes the coolant not to be supplied to the radiator 13 in step S160. Alternatively, the controller 60 makes the flow rate of the coolant supplied to the radiator 13 higher in step S150, but makes the flow rate of the coolant supplied to the radiator 13 lower in step S160.

(3) Although in the above-mentioned embodiments, the cooler core 16 and the heater core 17 are provided as the heat-medium circulation device, various other vehicle-mounted devices may be provided as the heat medium circulation device. In the defrosting mode with such a structure, the temperature of various other vehicle-mounted devices can be managed while defrosting the radiator 13.

(4) Although in the above-mentioned respective embodiments, the coolant is used as the heat medium, various kinds of media, such as oil, may be used as the heat medium.

Alternatively, a nanofluid may be used as the heat medium. The nanofluid is a fluid that contains nanoparticles having a particle size of the order of nanometer. By mixing the nanoparticles into the heat medium, the following functions and effects can be obtained, in addition to the function and effect of making an antifreezing fluid by decreasing the freezing point, like a coolant using ethylene glycol.

That is, the mixture of the nanoparticles in the heat medium can obtain the functions and effects of improving the thermal conductivity in a specific temperature range, increasing the thermal capacity of the heat medium, preventing the corrosion of metal pipes and the degradation of rubber pipes, and enhancing the fluidity of the heat medium at an ultralow temperature.

These functions and effects are varied depending on the particle configuration, shape, and blending ratio of the nanoparticles, and additive material thereto.

Because of this, the mixture of nanoparticles in the heat medium can improve its thermal conductivity, so that even a small amount of heat medium can obtain the cooling efficiency that is equal to the coolant using ethylene glycol.

Further, such a heat medium can also improve its thermal capacity and thereby can increase a cold storage amount due to sensible heat of the heat medium itself.

By increasing the cold storage amount, the temperature adjustment through cooling and heating of the device can be performed using the cold storage heat for some periods of time to save the power of the vehicle thermal management system, even though the compressor 22 is not operated.

An aspect ratio of the nanoparticle is preferably 50 or more. This is because such an aspect ratio can obtain the adequate thermal conductivity. Here, the aspect ratio of the nanoparticle is a shape index that indicates the ratio of the width to the height of the nanoparticle.

Nanoparticles suitable for use include any one of Au, Ag, Cu, and C. Specifically, examples of usable constituent atoms of the nanoparticles include Au nanoparticles, a Ag nanowire, a carbon nanotube (CNT), a graphene, graphite core-shell nanoparticles, an Au nanoparticle-containing CNT, and the like.

CNT refers to a carbon nanotube. The graphite core-shell nanoparticle is a particle body having a structure body, such as a carbon nanotube, enclosing the above-mentioned atom.

(5) In the refrigeration cycle 21 of each of the above-mentioned embodiments, fluorocarbon refrigerant is used as the refrigerant. However, the kind of refrigerant is not limited thereto, and may be natural refrigerant, such as carbon dioxide, a hydrocarbon-based refrigerant, and the like.

The refrigeration cycle 21 in each of the above-mentioned embodiments configures a subcritical refrigeration cycle in which a high-pressure side refrigerant pressure does not exceed the critical pressure of the refrigerant, but may configure a super-critical refrigeration cycle in which a high-pressure side refrigerant pressure exceeds the critical pressure of the refrigerant.

What is claimed is:

1. A refrigeration cycle device, comprising:
a compressor that draws and discharges a refrigerant;
a high-pressure side heat exchanger that exchanges heat between the refrigerant having a high pressure and discharged from the compressor and a heat medium;
a decompression portion that decompresses the refrigerant heat-exchanged in the high-pressure side heat exchanger;
a low-pressure side heat exchanger that exchanges heat between the refrigerant having a low pressure and decompressed in the decompression portion and the heat medium;
a first pump that draws and discharges the heat medium circulating through the low-pressure side heat exchanger;
a second pump that draws and discharges the heat medium circulating through the high-pressure side heat exchanger;
a vehicle-mounted device through which the heat medium circulates and that supplies heat to the heat medium;
a heat-medium air heat exchanger that exchanges heat between the heat medium and air;
a switching portion that switches between a state in which the heat medium circulates through the high-pressure side heat exchanger and a state in which the heat medium circulates through the low-pressure side heat exchanger with respect to each of the vehicle-mounted device and the heat-medium air heat exchanger; and
a controller configured to drive the compressor, while controlling an operation of the switching portion to switch to a defrosting mode in which the heat medium circulates between the low-pressure side heat exchanger and the vehicle-mounted device, and the heat medium circulates between the high-pressure side heat exchanger and the heat-medium air heat exchanger, when the controller determines that a defrosting of the heat-medium air heat exchanger is necessary; and a detector configured to detect a physical quantity in relation to a temperature of the heat medium circulating through the high-pressure side heat exchanger, wherein the controller controls an operation of the compressor based on the physical quantity detected by the detector, when determining that the defrosting of the heat-medium air heat exchanger is necessary, and in a case where the defrosting of the heat-medium air heat exchanger is determined to be necessary, the controller controls an operation of at least one of the switching portion and the second pump to lessen a flow rate of the heat medium supplied from the high-pressure side heat exchanger to the heat-medium air heat exchanger when a temperature of the heat medium circulating through the high-pressure side heat exchanger is determined to be below a set threshold value based on the physical quantity detected by the detector, as compared to when a temperature of the heat medium circulating through the high-pressure side heat exchanger is determined to exceed the set threshold value based on the physical quantity detected by the detector.

2. The refrigeration cycle device according to claim 1, wherein
in a case where the defrosting of the heat-medium air heat exchanger is determined to be necessary, the controller stops the compressor when a temperature of the heat medium circulating through the high-pressure side heat exchanger is determined to exceed a first threshold value based on the physical quantity detected by the detector.

3. The refrigeration cycle device according to claim 2, wherein
the first threshold value is a value equal to or higher than a freezing point of pure water.

4. The refrigeration cycle device according to claim 2, wherein
the controller stops the compressor when a temperature of the heat medium circulating through the high-pressure side heat exchanger is determined to increase and exceed the first threshold value based on the physical quantity detected by the detector, and
the controller drives the compressor when a temperature of the heat medium circulating through the high-pressure side heat exchanger is determined to decrease and be below a second threshold value based on the physical quantity detected by the detector.

5. The refrigeration cycle device according to claim 1, wherein
in a case where defrosting of the heat-medium air heat exchanger is determined to be necessary, the controller controls an operation of at least one of the switching portion and the second pump to stop supply of the heat medium from the high-pressure side heat exchanger to the heat-medium air heat exchanger when a temperature of the heat medium circulating through the high-pressure side heat exchanger is determined to be below the set threshold value based on the physical quantity detected by the detector, and
the controller controls an operation of at least one of the switching portion and the second pump to supply the heat medium from the high-pressure side heat exchanger to the heat-medium air heat exchanger when a temperature of the heat medium circulating through the high-pressure side heat exchanger is determined to exceed the set threshold value based on the physical quantity detected by the detector.

6. The refrigeration cycle device according to claim 1, wherein
the set threshold value is a value equal to or higher than a freezing point of pure water.

7. The refrigeration cycle device according to claim 1, wherein
the vehicle-mounted device is a device that generates heat during operation.

8. The refrigeration cycle device to be used for a vehicle according to claim 1, wherein
the controller controls an operation of the switching portion to prohibit execution of the defrosting mode while the vehicle is traveling even when defrosting of the heat-medium air heat exchanger is determined to be necessary.

9. The refrigeration cycle device according to claim 1, further comprising:
at least one heat-medium circulation device through which the heat medium circulates, wherein
the switching portion switches between a state in which the heat medium circulates through the low-pressure side heat exchanger and a state in which the heat medium does not circulate through the low-pressure side heat exchanger with respect to the at least one heat-medium circulation device, and
the controller controls an operation of the switching portion such that the heat medium circulates between the low-pressure side heat exchanger and the at least one heat-medium circulation device when defrosting of the heat-medium air heat exchanger is determined to be necessary.

10. The refrigeration cycle device according to claim 9, wherein
the at least one heat-medium circulation device is a heat exchanger that exchanges heat between the heat medium and air to be blown into a space to be air-conditioned.

11. The refrigeration cycle device according to claim 1, further comprising:
at least one heat-medium circulation device through which the heat medium circulates, wherein
the switching portion switches between a state in which the heat medium circulates through the high-pressure side heat exchanger and a state in which the heat medium does not circulate through the high-pressure side heat exchanger with respect to the at least one heat-medium circulation device, and
the controller controls an operation of the switching portion such that the heat medium circulates between the high-pressure side heat exchanger and the at least one heat-medium circulation device when defrosting of the heat-medium air heat exchanger is determined to be necessary.

12. A refrigeration cycle device comprising:
a compressor that draws and discharges a refrigerant;
a high-pressure side heat exchanger that exchanges heat between the refrigerant having a high pressure and discharged from the compressor and a heat medium;
a decompression portion that decompresses the refrigerant heat-exchanged in the high-pressure side heat exchanger;

a low-pressure side heat exchanger that exchanges heat between the refrigerant having a low pressure and decompressed in the decompression portion and the heat medium;

a first pump that draws and discharges the heat medium circulating through the low-pressure side heat exchanger;

a second pump that draws and discharges the heat medium circulating through the high-pressure side heat exchanger;

a vehicle-mounted device through which the heat medium circulates and that supplies heat to the heat medium;

a heat-medium air heat exchanger that exchanges heat between the heat medium and air;

a switching portion that switches between a state in which the heat medium circulates through the high-pressure side heat exchanger and a state in which the heat medium circulates through the low-pressure side heat exchanger with respect to each of the vehicle-mounted device and the heat-medium air heat exchanger; and a controller configured to drive the compressor, while controlling an operation of the switching portion to switch to a defrosting mode in which the heat medium circulates between the low-pressure side heat exchanger and the vehicle-mounted device, and the heat medium circulates between the high-pressure side heat exchanger and the heat-medium air heat exchanger, when the controller determines that a defrosting of the heat-medium air heat exchanger is necessary; and a detector configured to detect a physical quantity in relation to a temperature of the heat medium circulating through the high-pressure side heat exchanger, wherein the controller controls an operation of the compressor based on the physical quantity detected by the detector, when determining that the defrosting of the heat-medium air heat exchanger is necessary, in a case where the defrosting of the heat-medium air heat exchanger is determined to be necessary, the controller stops the compressor when a temperature of the heat medium circulating through the high-pressure side heat exchanger is determined to exceed a first threshold value based on the physical quantity detected by the detector, and in a case where defrosting of the heat-medium air heat exchanger is determined to be necessary, the controller controls an operation of at least one of the switching portion and the second pump to lessen a flow rate of the heat medium supplied from the high-pressure side heat exchanger to the heat-medium air heat exchanger when a temperature of the heat medium circulating through the high-pressure side heat exchanger is determined to be below a set threshold value based on the physical quantity detected by the detector, as compared to when a temperature of the heat medium circulating through the high-pressure side heat exchanger is determined to exceed the set threshold value based on the physical quantity detected by the detector, and the set threshold value is a value equal to or lower than the first threshold value.

13. The refrigeration cycle device according to claim 12, wherein the third threshold value is a value equal to the first threshold value.

\* \* \* \* \*